(12) United States Patent
Edwards et al.

(10) Patent No.: US 12,159,415 B2
(45) Date of Patent: Dec. 3, 2024

(54) MORE EFFICIENT AUTOMATIC DOOR SENSING

(71) Applicant: Capital One Services, LLC, McLean, VA (US)

(72) Inventors: Joshua Edwards, Philadelphia, PA (US); Michael Mossoba, Great Falls, VA (US); Abdelkader M'Hamed Benkreira, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 326 days.

(21) Appl. No.: 17/650,460

(22) Filed: Feb. 9, 2022

(65) Prior Publication Data

US 2023/0252646 A1 Aug. 10, 2023

(51) Int. Cl.
| | |
|---|---|
| *G06T 7/20* | (2017.01) |
| *E05F 15/73* | (2015.01) |
| *G06T 7/70* | (2017.01) |
| *G06V 20/40* | (2022.01) |
| *G06V 20/50* | (2022.01) |

(52) U.S. Cl.
CPC .............. *G06T 7/20* (2013.01); *G06T 7/70* (2017.01); *G06V 20/41* (2022.01); *G06V 20/50* (2022.01); *E05F 2015/765* (2015.01); *E05Y 2400/44* (2013.01); *E05Y 2400/45* (2013.01); *E05Y 2900/132* (2013.01); *G06T 2207/10016* (2013.01); *G06T 2207/30196* (2013.01)

(58) Field of Classification Search
CPC ... G06T 7/20; G06T 7/70; G06T 2207/10016; G06T 2207/30196; G06V 20/41; G06V 20/50; G06V 20/52; E05F 2015/765; E05F 2015/767; E05F 15/73; E05Y 2400/44; E05Y 2400/45; E05Y 2900/132
See application file for complete search history.

(56) References Cited

U.S. PATENT DOCUMENTS

| | | | |
|---|---|---|---|
| 7,397,929 B2 | 7/2008 | Nichani et al. | |
| 10,977,826 B1* | 4/2021 | Russo | ..................... E05F 15/73 |
| 11,120,559 B2* | 9/2021 | Goncharov | ............... G06T 7/20 |
| 2008/0250716 A1* | 10/2008 | Ranaudo | ............... E06B 3/4636 |
| | | | 49/31 |

(Continued)

FOREIGN PATENT DOCUMENTS

| | | | | |
|---|---|---|---|---|
| CN | 114922536 A | * | 8/2022 | ............. E05F 15/73 |
| DE | 102020203640 A1 | * | 9/2021 | |
| JP | 2023113004 A | * | 8/2023 | ............. E05F 15/73 |

OTHER PUBLICATIONS

Ambient.ai, "Entering the Era of Computer Vision Intelligence: How Modern, Privacy-Designed AI is Transforming Safety & Security Operations," Whitepaper, 2021, 6 Pages.

(Continued)

*Primary Examiner* — Charles T Shedrick
(74) *Attorney, Agent, or Firm* — Harrity & Harrity, LLP

(57) ABSTRACT

In some implementations, a processing device may receive, from an optical sensor, a plurality of frames encoding images of an environment of a door. The processing device may estimate, using the plurality of frames, a direction and a speed associated with at least one person included in the plurality of frames. Accordingly, the processing device may transmit a command to a controller associated with the door based on the direction and the speed.

20 Claims, 9 Drawing Sheets

(56) References Cited

U.S. PATENT DOCUMENTS

| | | | | |
|---|---|---|---|---|
| 2013/0136313 A1* | 5/2013 | Maeda | ................. | G06V 40/172 |
| | | | | 382/111 |
| 2018/0181802 A1* | 6/2018 | Chen | .................... | G06V 10/764 |
| 2023/0326227 A1* | 10/2023 | Park | ....................... | G07C 9/253 |

OTHER PUBLICATIONS

Wan et al., "A Survey on Gait Recognition," ACM Computing Surveys, vol. 51, No. 5, Article 89, Aug. 2018, 35 Pages.

* cited by examiner

MORE EFFICIENT AUTOMATIC DOOR SENSING

BACKGROUND

Automatic doors are usually operated with motion sensors. For example, the motion sensor may include a lower resolution array of pixels that trigger when a change in brightness satisfies a brightness threshold. Accordingly, a controller for the automatic door may instruct the door to open when a quantity of pixels that are triggered satisfies a quantity threshold.

SUMMARY

Some implementations described herein relate to a system for automatic door sensing. The system may include one or more memories and one or more processors communicatively coupled to the one or more memories. The one or more processors may be configured to receive, from an optical sensor, a plurality of frames encoding images of an environment of a door. The one or more processors may be further configured to classify the plurality of frames as including at least one person. The one or more processors may be configured to estimate, using the plurality of frames, a direction and a speed associated with the at least one person. The one or more processors may be further configured to identify a first orientation associated with the at least one person in at least one first frame of the plurality of frames. The one or more processors may be configured to transmit a command to a controller associated with the door based on the direction, the speed, and the first orientation.

Some implementations described herein relate to a method of automatic door sensing. The method may include receiving, from an optical sensor, a plurality of frames encoding images of an environment of a door. The method may further include estimating, using the plurality of frames, a direction and a speed associated with at least one person included in the plurality of frames. The method may include transmitting a command to a controller associated with the door based on the direction and the speed.

Some implementations described herein relate to a non-transitory computer-readable medium that stores a set of instructions for automatic door sensing for a device. The set of instructions, when executed by one or more processors of the device, may cause the device to receive, from an optical sensor, a plurality of frames encoding images of an environment of a door. The set of instructions, when executed by one or more processors of the device, may further cause the device to classify the plurality of frames as including at least one person. The set of instructions, when executed by one or more processors of the device, may cause the device to estimate, using the plurality of frames, a direction associated with the at least one person. The set of instructions, when executed by one or more processors of the device, may cause the device to identify at least one article of clothing associated with the at least one person in at least one of the plurality of frames. The set of instructions, when executed by one or more processors of the device, may further cause the device to transmit a command to a controller associated with the door based on the direction and the at least one article of clothing.

DETAILED DESCRIPTION

The following detailed description of example implementations refers to the accompanying drawings. The same reference numbers in different drawings may identify the same or similar elements.

Typical motion sensors include a lower resolution array of pixels that trigger when a change in brightness satisfies a brightness threshold. Accordingly, a controller for the automatic door may instruct the door to open when a quantity of pixels that are triggered satisfies a quantity threshold. The motion sensor may be passive (e.g., detecting changes in brightness relative to a normalized background measurement) or active (e.g., emitting microwave radiation and/or other non-visible light or ultrasonic waves and/or other non-audible audio, among other examples). However, these motion sensors result in false positives that waste power and mechanical resources opening the door. As a result, resources are wasted on climate control in a building to which the door controls access.

Sometimes, to reduce false positives, motion sensors may use infrared detection as a proxy for detecting movement of animate beings and not inanimate beings. However, infrared detectors still trigger for humans that do not desire to enter the building and for animals. Accordingly, false positives still waste power and mechanical resources.

Some implementations described herein provide for controlling a door based on a motion model applied to frames, encoding images of an environment of the door, from an optical sensor. As a result, power and mechanical resources are conserved because the door is not opened for humans that do not evidence an intent to enter the building. Additionally, by using two-dimensional frames, processing resources and memory are conserved when the frames are processed to determine whether to open the door.

Figure 1A:
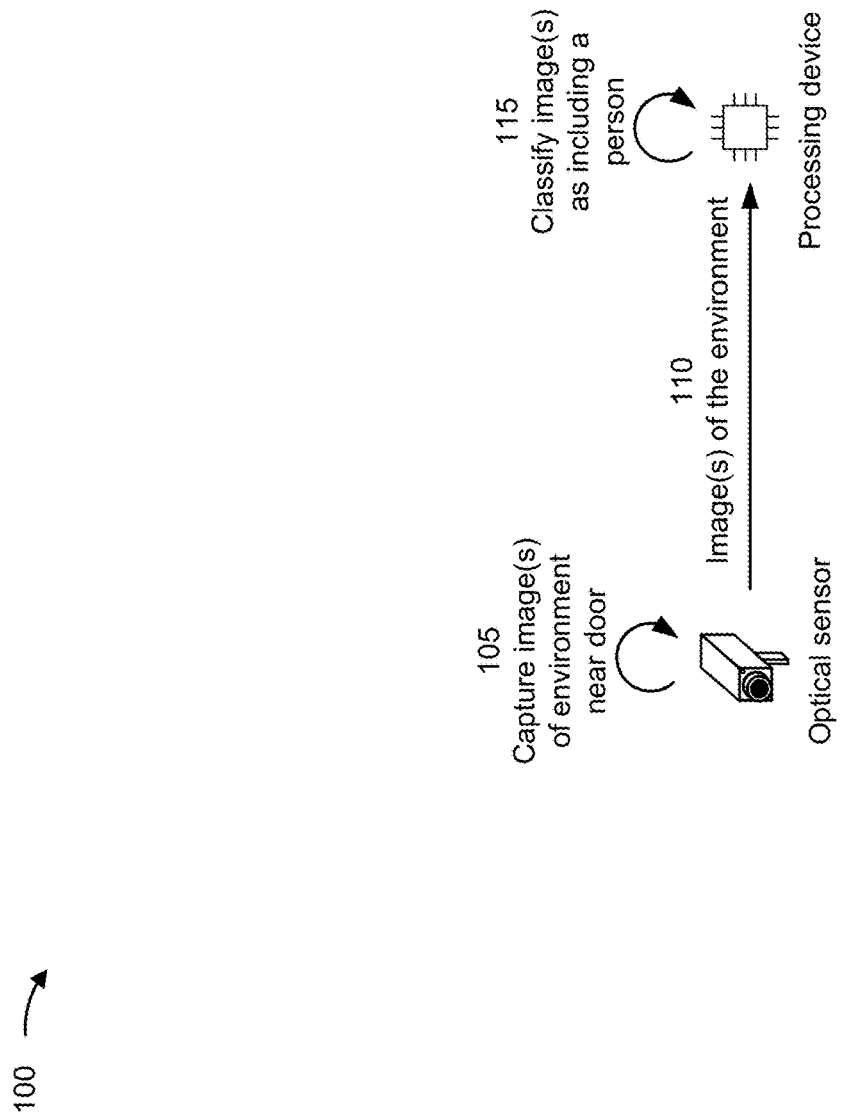
FIGS. 1A-1C are diagrams of an example implementation relating to more efficient automatic door sensing.
Figure 1B:
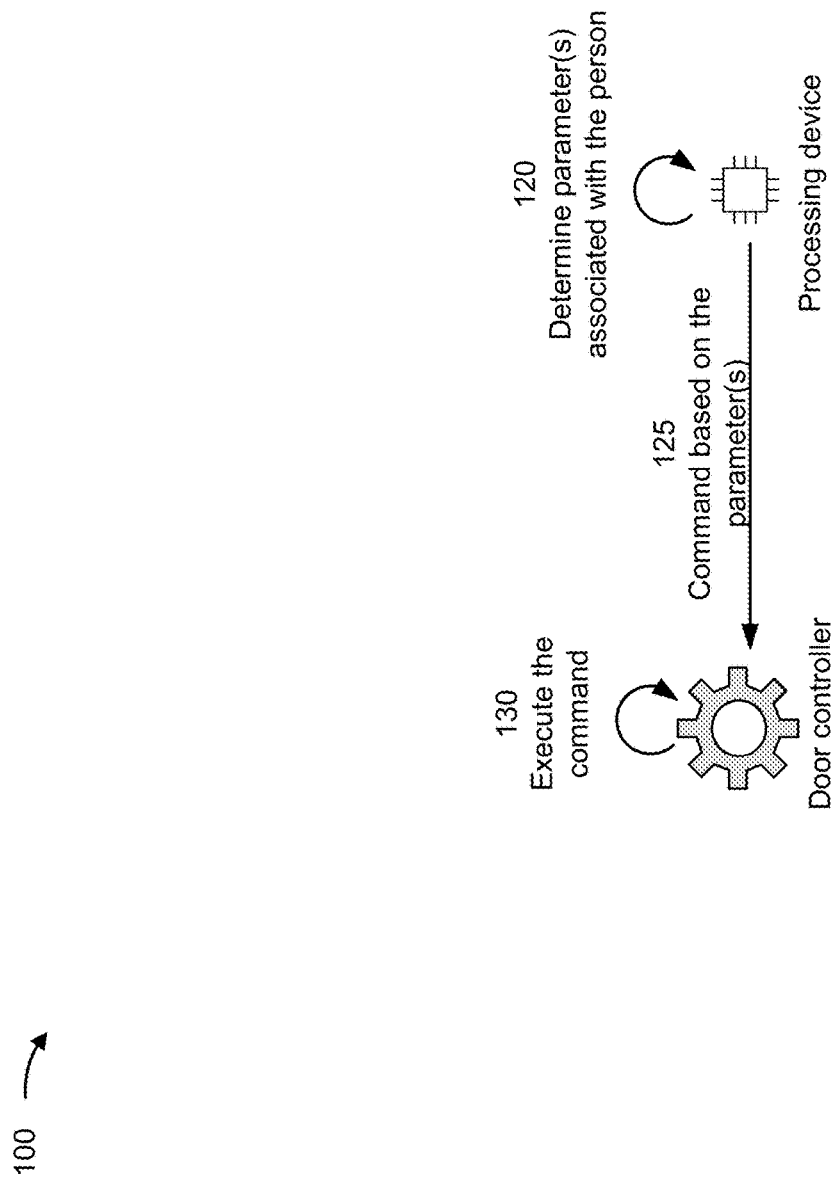
Figure 1C:
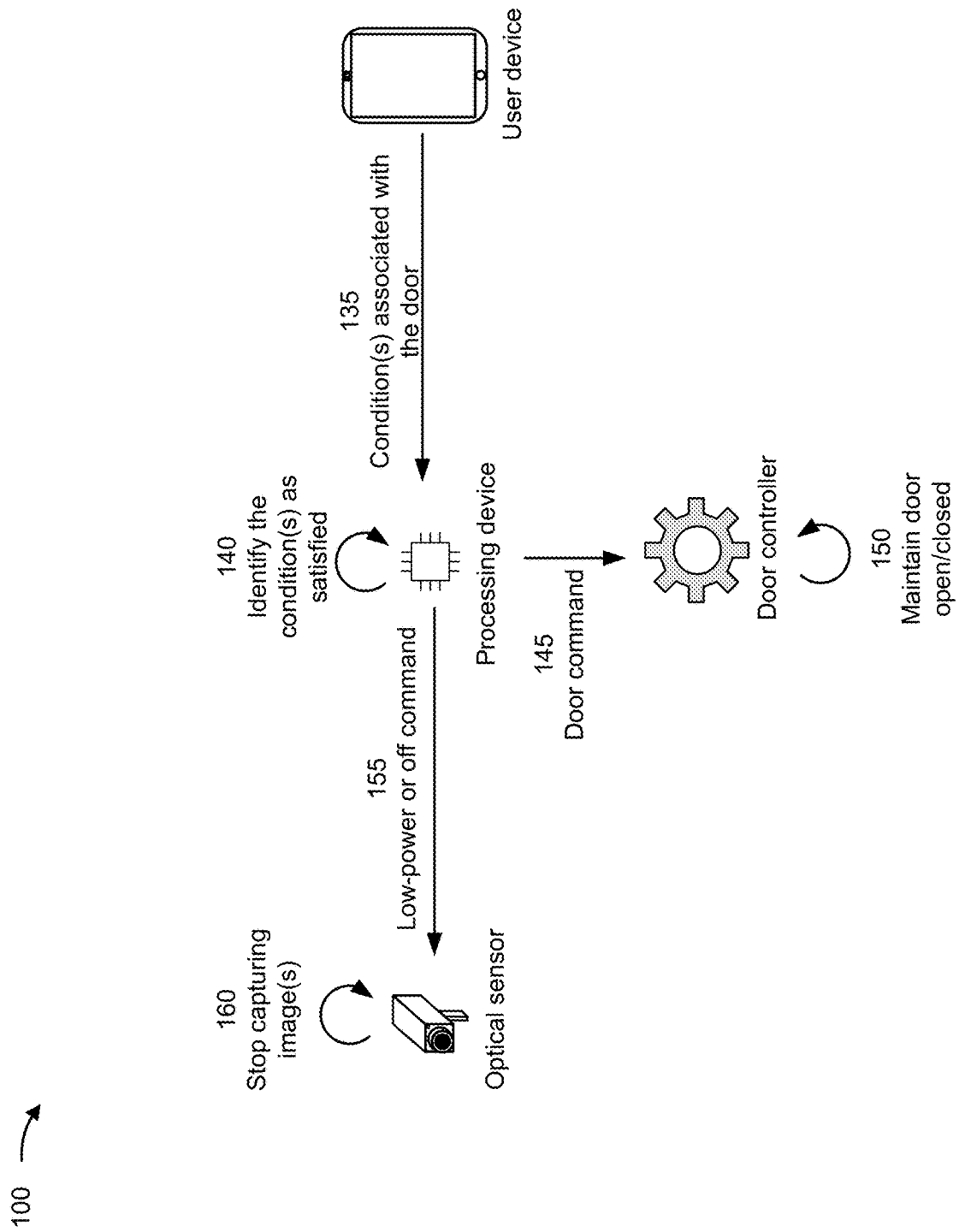

FIGS. 1A-1C are diagrams of an example 100 associated with more efficient automatic door sensing. As shown in FIGS. 1A-1C, example 100 includes an optical sensor, a processing device, a door controller, and a user device. These devices are described in more detail in connection with FIGS. 3 and 4.

As shown in FIG. 1A and by reference number 105, an optical sensor may capture images (e.g., one or more images) of an environment near a door. For example, the optical sensor may capture a video of the environment at a configured frame rate such that the images are frames within the video. Accordingly, in some implementations, the images may be encoded as intra frames (e.g., I frames) and inter frames (e.g., P frames and/or B frames) (e.g., according to a codec, such as a moving picture experts group (MPEG) standard). As an alternative, the images may be encoded as image files (e.g., joint photographic experts group (JPEG) files, graphics interchange format (GIF) files, portable network graphics (PNG) files, and/or other types of image files).

The environment of the door includes an exterior volume associated with people entering a structure through the door and an interior volume associated with people exiting the structure through the door. Accordingly, the door may function to insulate a climate of the building from a climate outdoors. Additionally, or alternatively, the door may function as access control for the building (or for a portion of the building, such as a room or a hallway) from outdoors (or from a different portion of the building).

As shown by reference number 110, the optical sensor may transmit, and the processing device may receive, a plurality of frames encoding the images of the environment of the door. For example, the optical sensor may buffer video to the processing device, where the video includes the plurality of frames. Alternatively, the optical sensor may use a memory (e.g., an external memory and/or a memory integrated with a wafer of the optical sensor) to perform loop recording such that video files are transferred to the processing device periodically.

As an alternative, the plurality of frames may be encoded as separate image files. For example, the optical sensor may capture images of the environment periodically and transmit each captured image to the processing device. Alternatively, the optical sensor may use a memory (e.g., an external memory and/or a memory integrated with a wafer of the optical sensor) to stored captured images such that images files are transferred, in batches, to the processing device periodically.

As shown by reference number 115, the processing device may classify the plurality of frames as including a person (e.g., at least one person). For example, the processing device may apply a classifier to the plurality of frames to detect a portion of the plurality of frames including the person. In some implementations, the classifier may use edge matching, feature clustering, a scale-invariant feature transform (SIFT), a speeded up robust features (SURF) approach, a convolutional neural network (CNN), and/or another model to identify the presence (and location) of the person within the frames. The classifier may output, for each frame, an indication of an average (or median) location of the person (e.g., in pixels), an indication of an array or group of pixels that include the person, an indication of a bounding box (or other shape) that includes the person, and/or another similar indication of where the person is located in the frame.

By using a classifier, the processing device may discard frames based on classifying the frames as not including any persons. This conserves memory space (e.g., at an external memory communicatively coupled with the processing device and/or at a memory integrated with a wafer of the processing device) as well as conserving power and mechanical resources by reducing false positives usually caused by movement of non-human animate beings and/or inanimate beings.

Accordingly, as shown in FIG. 1B and by reference number 120, the processing device may determine parameters (e.g., at least one parameter) associated with the person. For example, the processing device may estimate, using the plurality of frames, a direction associated with the person. In some implementations, the processing device may track pixel and/or gradient changes across the plurality of frames to estimate the direction. Additionally, or alternatively, the processing device may apply a motion model, to a portion of the plurality of frames identified as including the person by the classifier, to estimate the direction. For example, the motion model may use kernel-based tracking and/or contour tracking, optionally coupled with one or more Kalman filters and/or particle filters. As a result, the processing device may calculate a directional vector (e.g., as described in connection with FIGS. 2A-2C) associated with the person. By using two-dimensional frames from one or two optical sensors, the processing device conserves processing resources, memory, and power as compared with constructing three-dimensional models of the environment of the door. Additionally, by using tracking with two-dimensional frames, the processing device conserves processing resources, memory, and power as compared with three-dimensional techniques, such as egomotion and optical flow techniques.

Additionally, in some implementations, the processing device may estimate, using the plurality of frames, a speed associated with the person. The speed may be a numerical estimate (e.g., a relative estimate, such as pixels per second, or an absolute estimate, such as meters per minute) or may be a categorization (e.g., whether the person is stationary, moving slowly, moving moderately, or moving quickly, among other examples). For example, the processing device may use the same motion model as described above to estimate the speed. Additionally, or alternatively, the processing device may be calibrated based on dimensions of a background object (e.g., one or more background objects) in the plurality of frames such that the processing device may calculate the speed based on locations of the person, across the frames, output by the classifier.

Additionally, or alternatively, the processing device may identify an orientation (e.g., at least one orientation) associated with the person in a frame (e.g., at least one frame) of the plurality of frames. For example, the processing device may apply an additional classifier (e.g., using edge matching, feature clustering, a SIFT, a SURF approach, a CNN, and/or another model) to identify the orientation of the person. In some implementations, to conserve processing power and increase accuracy, the processing device may apply the additional classifier to the portion of the plurality of frames identified as including the person by the classifier and not to a remaining portion of the plurality of frames. Examples of an orientation for a user may include facing the door (e.g., because feet, shoulders, a chest, and/or another part of the person's body are pointed toward the door at an angle that satisfies an angle threshold), facing away from the door (e.g., because feet, shoulders, a chest, and/or another part of the person's body are pointed away from the door at an angle that satisfies an angle threshold), facing the door with head pointed away from the door, or facing away from the door with head pointed toward the door, among other examples.

In some implementations, the processing device may identify a first orientation (e.g., as described above) in a first frame (e.g., one or more first frames) that was captured earlier in time than a second frame (e.g., one or more second frames). Accordingly, the processing device may additionally identify a second orientation (e.g., as described above) in the second frame. Accordingly, the processing device may identify a change from the first orientation to the second orientation. For example, the processing device may identify a change in how the person's body is angled, relative to the door, and/or a change in how the person's head is angled, relative to the door, among other examples.

Additionally, or alternatively, in some implementations, the processing device may estimate a distance from the at least one person to the door. The distance may be a numerical estimate (e.g., a relative estimate, such as pixels, or an absolute estimate, such as meters) or may be a categorization (e.g., whether the person is close to the door or far from the door, among other examples). For example, the processing device may use the same motion model as described above to estimate the distance. Additionally, or alternatively, the processing device may be calibrated based on dimensions of a background object (e.g., one or more background objects) in the plurality of frames such that the processing device may calculate the distance based on a location of the person output by the classifier.

Additionally, or alternatively, in some implementations, the processing device may identify an article of clothing (e.g., at least one article of clothing) associated with the person in a frame (e.g., at least one frame) of the plurality of frames. For example, the processing device may apply an additional classifier (e.g., using edge matching, feature clustering, a SIFT, a SURF approach, a CNN, and/or another model) to identify the article of clothing. In some implementations, to conserve processing power and increase accuracy, the processing device may apply the additional classifier to the portion of the plurality of frames identified as including the person by the classifier and not to a remaining portion of the plurality of frames. Examples of an article of clothing may include a mask or hood, a jacket, shoes, or a hat, among other examples.

Thus, as shown by reference number 125, the processing device may transmit a command to a controller associated with the door (the "door controller") based on the parameter (s) described above. The command may include a command to open the door, to close the door, to maintain the door in an open position, or to maintain the door in a closed position. In some implementations, the command may be based on the direction associated with the person. For example, the processing device may transmit a command to open the door (or to maintain the door in an open position) based on the person moving toward the door (e.g., a directional vector as described in connection with FIGS. 2A-2B with an angle toward the door that satisfies a threshold). Similarly, the processing device may transmit a command to close the door (or to maintain the door in a closed position) based on the person moving away from the door (e.g., a directional vector as described in connection with FIGS. 2A-2B with an angle away from the door that satisfies a threshold) or remaining stationary (e.g., a stationary indicator as described in connection with FIG. 2C).

Additionally, or alternatively, the command may be based on the distance associated with the person. For example, the processing device may transmit a command to open the door (or to maintain the door in an open position) based on the distance satisfying a threshold. Similarly, the processing device may transmit a command to close the door (or to maintain the door in a closed position) based on the distance failing to satisfy a threshold.

Additionally, or alternatively, the command may be based on the speed associated with the person. For example, the processing device may transmit a command to open the door (or to maintain the door in an open position) based on the speed satisfying a threshold. Similarly, the processing device may transmit a command to close the door (or to maintain the door in a closed position) based on the speed failing to satisfy a threshold.

Additionally, or alternatively, the command may be based on the orientation associated with the person. For example, the processing device may transmit a command to open the door (or to maintain the door in an open position) based on the person facing the door (e.g., as described above) and/or a head of the person facing the door. Similarly, the processing device may transmit a command to close the door (or to maintain the door in a closed position) based on the person facing away from the door (e.g., as described above) and/or a head of the person facing away from the door. In some implementations, the command may be based on a change in orientation associated with the person. For example, the processing device may transmit a command to open the door (or to maintain the door in an open position) based on the person moving (or moving their head) to point toward the door. Similarly, the processing device may transmit a command to close the door (or to maintain the door in a closed position) based on the person moving (or moving their head) to point away from the door.

Additionally, or alternatively, the command may be based on the article of clothing associated with the person. For example, the processing device may transmit a command to open the door (or to maintain the door in an open position) based on the article of clothing satisfying a threshold (e.g., the person is wearing required attire, such as shoes, a mask, or a jacket) or not satisfying a threshold (e.g., the person is not wearing banned attire, such as a mask or a hat). Similarly, the processing device may transmit a command to close the door (or to maintain the door in a closed position) based on the article of clothing satisfying a threshold (e.g., the person is wearing required banned attire, such as a mask or a hat) or not satisfying a threshold (e.g., the person is not wearing required attire, such as shoes, a mask, or a jacket).

The parameters described above may be combined. In some implementations, the parameters may be combined logically or sequentially. Accordingly, the processing device may combine the parameters using an "and" operation. In one example, the processing device may transmit a command to open the door (or to maintain the door in an open state) based on the distance associated with the person satisfying a distance threshold and the direction associated with the person satisfying a direction threshold. Additionally, or alternatively, the processing device may combine the parameters sequentially. In one example, the speed associated with the person is used to select the distance threshold for determining whether to open the door. Accordingly, the processing device can increase the threshold for slow walkers and decrease the threshold for fast walkers. Additionally, or alternatively, the parameters may be combined holistically. For example, the processing device may generate a score indicating how likely the person is to want to go through the door based on the direction, the orientation, the speed, and/or the distance and transmit a command to open the door (or to maintain the door in an open state) based on the score associated with the person satisfying a likeliness threshold. In any of the examples described above, a parameter (e.g., one or more parameters) may serve as a final check. For example, the processing device may make a final decision based on the article of clothing associated with the person.

Accordingly, as shown by reference number 130, the door controller may execute the command. For example, the door controller may open the door, close the door, or maintain the door in an open or closed state. In some implementations, the processing device may discard the plurality of frames after transmitting the command. As a result, the processing device conserves memory space.

In some implementations, and as shown in FIG. 1C and by reference number 135, the processing device may receive (e.g., from the user device) input associated with a condition (e.g., one or more conditions) associated with the door. For example, a user may use the user device to access an app that communicates with the processing device or to navigate to a website hosted on a server that communicates with the processing device.

In some implementations, the condition may include a time period, a temperature range, a humidity range, and/or another condition that can be satisfied. Accordingly, as shown by reference number 140, the processing device may determine whether the condition is satisfied. In one example, the condition includes a day (e.g., Sundays) on which, or time (e.g., after midnight until 3 am) during which, the door should remain closed. In another example, the condition includes a temperature range and/or a humidity in which the door should remain open. The processing device may determine the temperature and/or humidity using a sensor integrated with the door and/or information from the Internet.

Based on determining that the condition is satisfied, and as shown by reference number 145, the processing device may transmit a command to the door controller. For example, the processing device may transmit a command to open the door (or to maintain the door in an open state) or a command to close the door (or to maintain the door in a closed state), depending on the input. Accordingly, as shown by reference number 150, the door controller may execute the command. In some implementations, the processing device may indicate that the command expires after an amount of time. Alternatively, the processing device may determine when the condition is no longer satisfied and indicate the same to the door controller.

In order to conserve power and processing resources while the condition is satisfied, and as shown by reference number 155, the processing device may disable the optical sensor. Accordingly, the optical sensor conserves power and processing resources by turning off or operating in a low-power mode, as shown by reference number 160. In some implementations, the processing device may indicate that the disablement expires after an amount of time. Alternatively, the processing device may determine when the condition is no longer satisfied and indicate the same to the optical sensor.

Alternatively, the input may include an override command to open the door, close the door, or maintain the door in an open or closed position for an amount of time (e.g., indicated by the input or preconfigured as a default value). Accordingly, the door controller may open the door, close the door, or maintain the door in an open or closed position for an amount of time, according to the override command. Additionally, the processing device may disable the optical sensor to conserve power and processing resources at both the optical sensor and the processing device during the amount of time. In some implementations, the processing device may re-enable the optical sensor before the amount of time is up (e.g., a few seconds before or one minute before, among other examples) to allow time for the optical sensor to begin capturing frames and the processing device to process the frames upon expiry of the override command.

By using techniques as described in connection with FIGS. 1A-1C, the processing device controls the door based on the motion model applied to the plurality of frames from the optical sensor. As a result, power and mechanical resources are conserved because the door is not opened for humans that do not indicate a desire to enter the building.

As indicated above, FIGS. 1A-1C are provided as an example. Other examples may differ from what is described with regard to FIGS. 1A-1C.

Figure 2A:
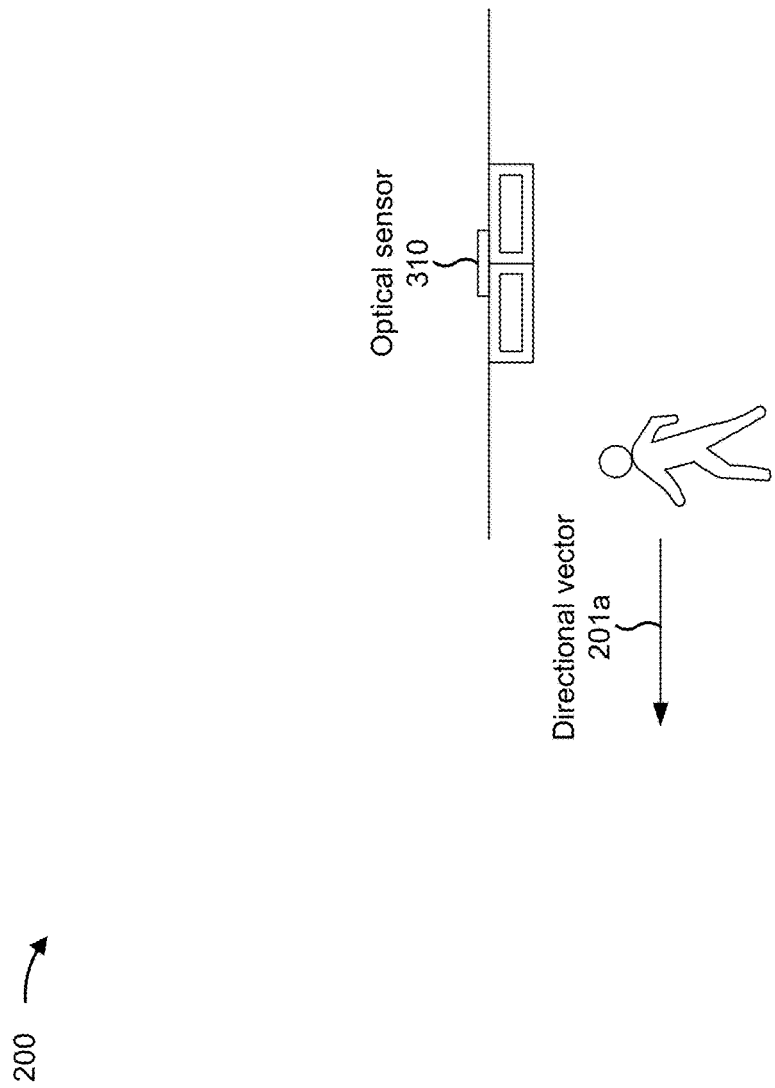
FIGS. 2A-2C are diagrams of example directional vectors used in implementations described herein.
Figure 2B:
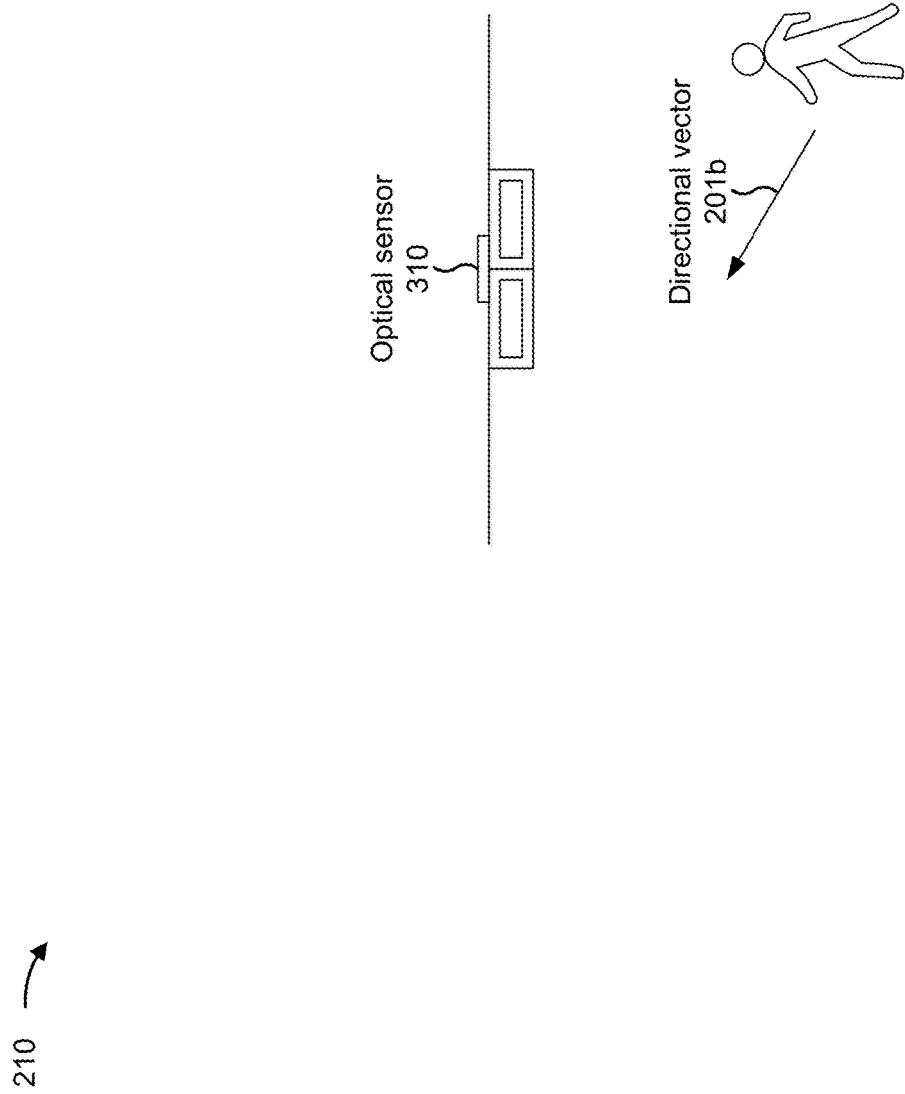
Figure 2C:
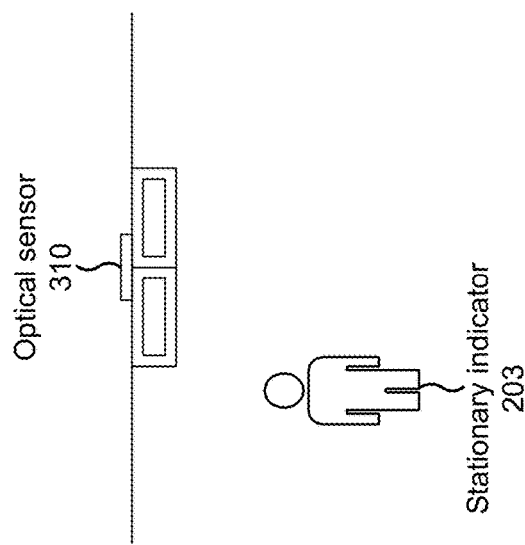

FIGS. 2A, 2B, and 2C are diagrams of examples 200, 210, and 220, respectively, associated with directional vectors. Examples 200, 210, and 220 each include an optical sensor 310 that captures images of an environment with a door. This device described in more detail in connection with FIGS. 3 and 4.

As shown in FIG. 2A, example 200 includes a directional vector 201a directed away from the door. Accordingly, as described in connection with FIG. 1B, a processing device (e.g., processing device 330) may determine to keep the door closed in order to conserve power and mechanical resources.

As shown in FIG. 2B, example 210 includes a directional vector 201b directed toward the door. Accordingly, as described in connection with FIG. 1B, a processing device (e.g., processing device 330) may determine to open the door.

As shown in FIG. 2C, example 220 includes a stationary indicator 203. Accordingly, as described in connection with FIG. 1B, a processing device (e.g., processing device 330) may determine to keep the door closed in order to conserve power and mechanical resources.

As indicated above, FIGS. 2A-2C are provided as an example. Other examples may differ from what is described with regard to FIGS. 2A-2C.

Figure 3:
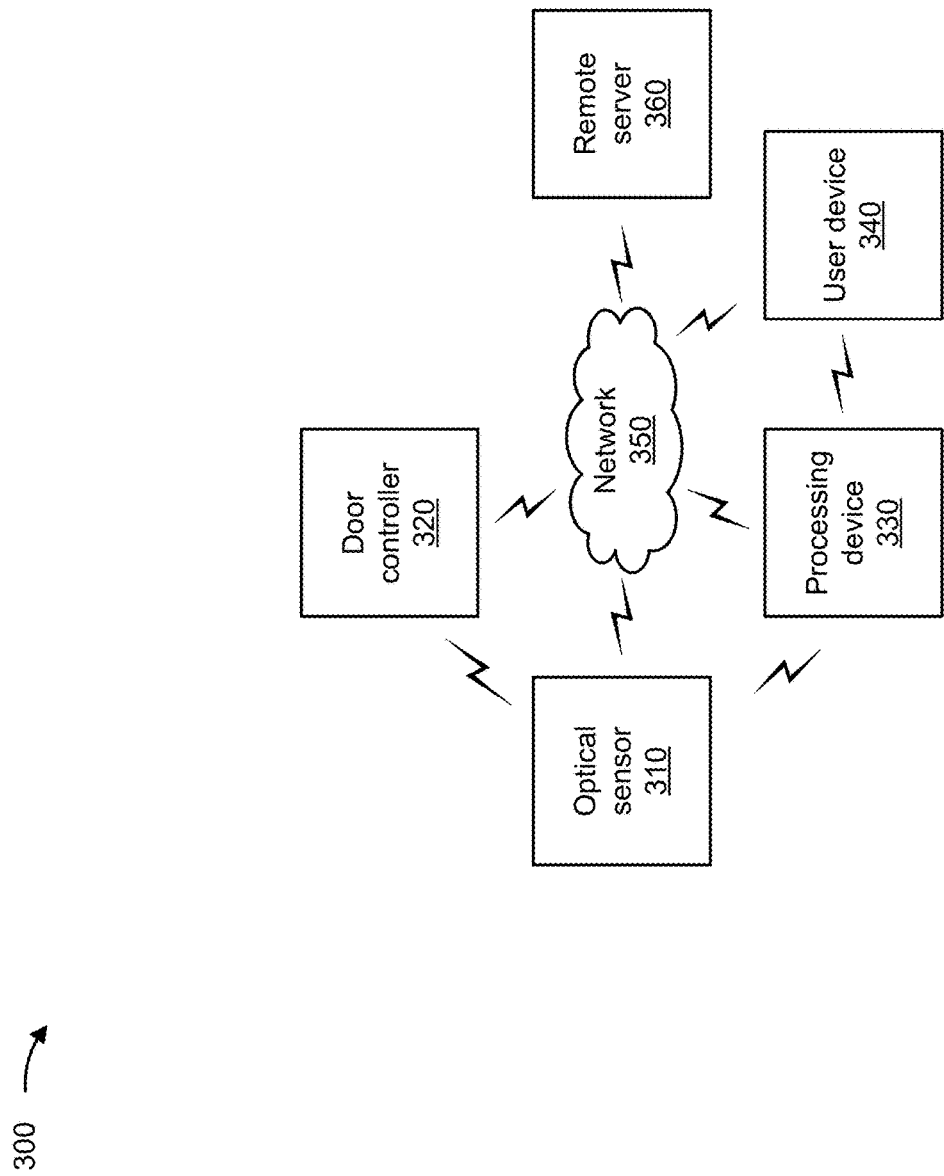
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an optical sensor 310, a door controller 320, a processing device 330, a user device 340, a network 350, and/or a remote server 360. Devices of environment 300 may interconnect via wired connections and/or wireless connections.

The optical sensor 310 includes one or more devices capable of converting photons into electronic signals (e.g., analog signals using photodiodes and/or digital signals using an analog-to-digital converter (ADC)). For example, the optical sensor 310 may include a camera, such as a charge-coupled device (CCD) or an active-pixel sensor (such as a complementary metal-oxide-semiconductor (CMOS) sensor), and/or another array or grouping of one or more light-sensitive pixels. The optical sensor 310 may include one or more output components to transmit analog or digital signals for post-processing (e.g., at the processing device 330). Example output components of the optical sensor 310 include a bus and/or another type of electrical interface. The optical sensor 310 may further include one or more input components to facilitate obtaining control information (e.g., thresholds for triggering pixels, pixel regions to activate or deactivate, sample rates for converting analog measurements to digital signals, and/or other similar control information). Example input components of the optical sensor 310 include a bus and/or another type of electrical interface.

The door controller 320 includes one or more devices capable of generating and transmitting control signals for mechanical components of a door (e.g., motors, wheels, wires, pulleys, and/or other mechanical components that unlock, open, lock, and/or close the door) and receiving and processing measurements from sensors associated with the door (e.g., location sensors, speedometers, fault sensors, and/or other similar sensors). For example, the door controller 320 may include one or more integrated circuits, such as application-specific integrated circuits (ASICs), one or more microprocessors, one or more central processing units (CPUs), and/or other similar processing devices. Alternatively, the door controller 320 may be implemented on one or more servers and/or computing hardware (e.g., in a cloud computing environment or separate from a cloud computing environment).

The processing device 330 includes one or more devices capable of processing data from the optical sensor 310 and/or the door controller 320 and transmitting commands to the optical sensor 310 and/or the door controller 320. For example, the processing device 330 may include one or more integrated circuits, such as ASICs, one or more microprocessors, one or more CPUs, and/or other similar processing devices. Alternatively, the processing device 330 may be implemented on one or more servers and/or computing hardware (e.g., in a cloud computing environment or separate from a cloud computing environment).

The user device 340 includes one or more devices capable of transmitting commands to, and receiving information from, the processing device 330. The user device 340 may include a communication device and/or a computing device. For example, the user device 340 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 340 may be capable of communicating with the processing device 330 and/or the remote server 360 via the network 350, as described elsewhere herein. Additionally, in some implementations, the user device 340 may be capable of communicating directly with the processing device 330 (e.g., via near field communication (NFC), Bluetooth® signals, universal serial bus (USB), and/or another type of short-range wireless or wired communication).

The network 350 includes one or more wired and/or wireless networks. For example, the network 350 may include a cellular network, a public land mobile network, a local area network, a wide area network, a metropolitan area network, a telephone network, a private network, the Internet, and/or a combination of these or other types of networks. The network 350 enables communication among the devices of environment 300. In some implementations, the processing device 330 may communicate with the remote server 360 using a first network (e.g., a wired network) and may communicate with the user device 340 using a second network (e.g., a wireless network).

The remote server 360 includes one or more devices capable of transmitting commands to, and receiving information from, the processing device 330. Additionally, or alternatively, the remote server 360 may include one or more devices capable of exchanging information with the user device 340. The remote server 360 may include one or more servers and/or computing hardware (e.g., in a cloud computing environment or separate from a cloud computing environment) configured to communicate with the processing device 330 and/or the user device 340, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
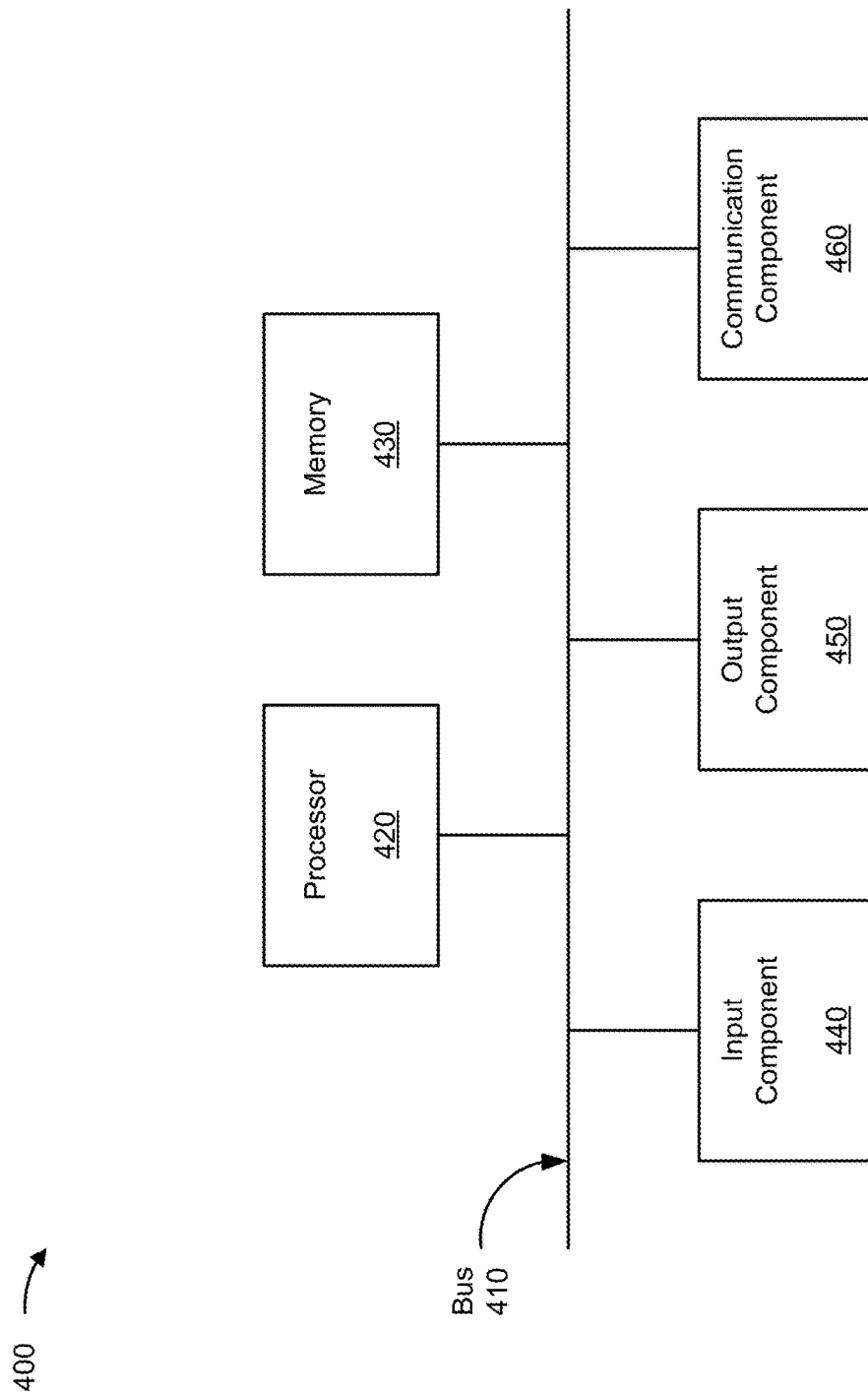
FIG. 4 is a diagram of example components of one or more devices of FIG. 3.

FIG. 4 is a diagram of example components of a device 400, which may correspond to an optical sensor, a door controller, a processing device, a user device, and/or a remote server. In some implementations, an optical sensor, a door controller, a processing device, a user device, and/or a remote server may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
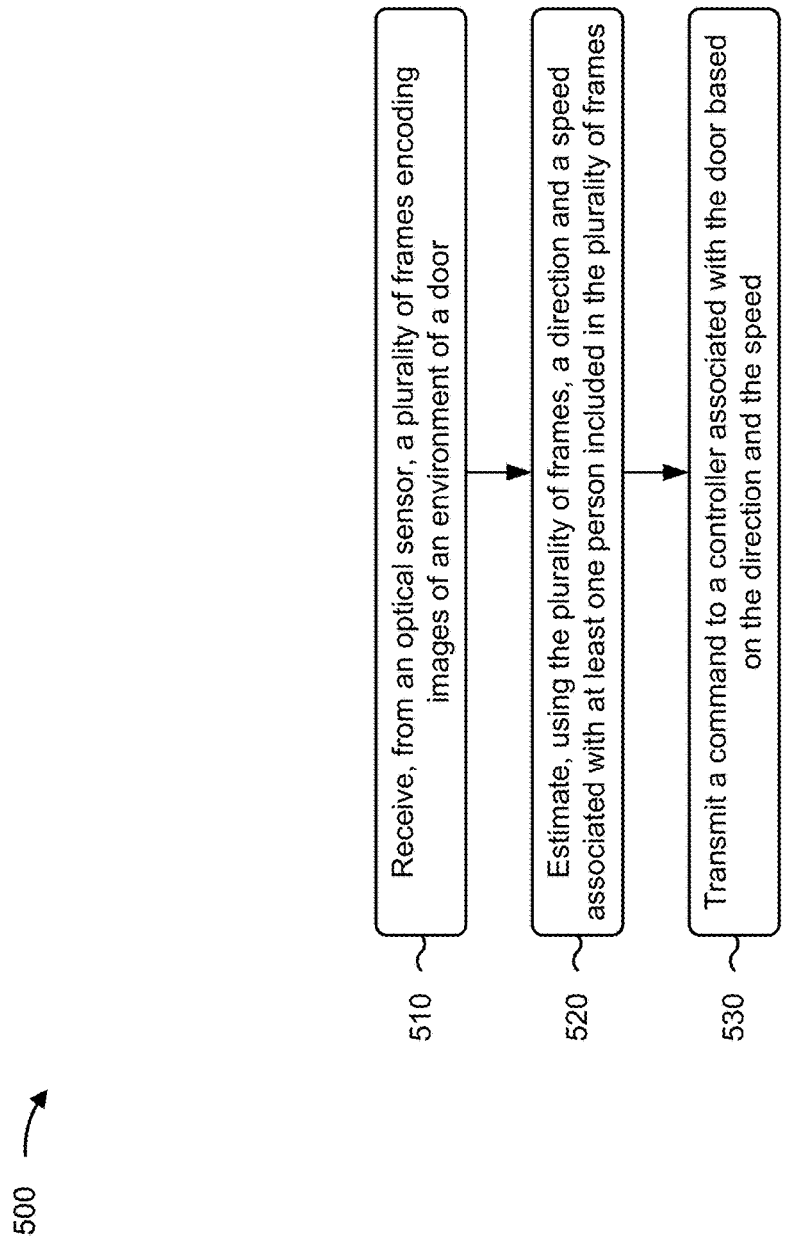
FIG. 5 is a flowchart of an example process relating to more efficient automatic door sensing.

FIG. 5 is a flowchart of an example process 500 associated with more efficient automatic door sensing. In some implementations, one or more process blocks of FIG. 5 may be performed by a device (e.g., processing device 330). In some implementations, one or more process blocks of FIG. 5 may be performed by another device or a group of devices separate from or including the device, such as optical sensor 310, door controller 320, user device 340, and/or remote server 360. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving, from an optical sensor, a plurality of frames encoding images of an environment of a door (block 510). As further shown in FIG. 5, process 500 may include estimating, using the plurality of frames, a direction and a speed associated with at least one person included in the plurality of frames (block 520). For example, process 500 may include classifying the plurality of frames as including the at least one person. As further shown in FIG. 5, process 500 may include transmitting a command to a controller associated with the door based on the direction and the speed (block 530). In some implementations, process 500 may include identifying at least one orientation associated with the at least one person in at least one frame of the plurality of frames, such that the command is further based on the at least one orientation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automatic door sensing, the system comprising:
   one or more memories; and
   one or more processors, communicatively coupled to the one or more memories, configured to:
   receive, from an optical sensor, a plurality of frames encoding images of an environment of a door;
   classify the plurality of frames as including at least one person;
   estimate, using the plurality of frames, a direction and a speed associated with the at least one person;
   identify a first orientation associated with the at least one person in at least one first frame of the plurality of frames;
   identify at least one article of clothing associated with the at least one person in at least one of the plurality of frames; and
   transmit a command to a controller associated with the door based on the direction, the speed, the first orientation and the at least one article of clothing, wherein the one or more processors, when transmitting the command, are to:
   transmit a command to open the door based on the at least one article of clothing satisfying a type of clothing, or
   transmit a command to keep the door closed based on the at least one article of clothing not satisfying a type of clothing.

2. The system of claim 1, wherein the one or more processors are further configured to:

identify a change from the first orientation in the at least one first frame to a second orientation in at least one second frame of the plurality of frames,
wherein the command is based on the change from the first orientation to the second orientation.

3. The system of claim 1, wherein the one or more processors are further configured to:
discard the plurality of frames after transmitting the command.

4. The system of claim 1, wherein the one or more processors are further configured to:
receive input associated with a time period; and
transmit a command to disable the optical sensor during the time period.

5. The system of claim 4, wherein the one or more processors are further configured to:
transmit a command, to the controller associated with the door, to maintain the door in a closed position during the time period.

6. The system of claim 1, wherein the one or more processors are further configured to:
estimate a distance from the at least one person to the door,
wherein the command is based on whether the distance satisfies a threshold.

7. The system of claim 6, wherein the threshold is selected, from a plurality of thresholds, based on the speed.

8. The system of claim 1, wherein the one or more processors are further configured to:
receive, from the optical sensor, an additional plurality of frames encoding images of the environment of the door; and
discard the additional plurality of frames based on classifying the additional plurality of frames as not including any persons.

9. A method of automatic door sensing, comprising:
receiving, from an optical sensor, a plurality of frames encoding images of an environment of a door;
estimating, using the plurality of frames, a direction and a speed associated with at least one person included in the plurality of frames;
identify at least one article of clothing associated with the at least one person in at least one of the plurality of frames; and
transmitting a command to a controller associated with the door based on the direction, the speed, and the at least one article of clothing,
wherein transmitting the command comprises:
transmitting a command to open the door based on the at least one article of clothing satisfying a clothing threshold, or
transmitting a command to keep the door closed based on the at least one article of clothing not satisfying a clothing threshold.

10. The method of claim 9, wherein estimating the direction and the speed comprises:
applying a classifier to the plurality of frames to detect a portion of the plurality of frames including at least one person; and
applying a motion model to the portion of the plurality of frames to estimate the direction and the speed.

11. The method of claim 9, wherein transmitting the command to open the door further comprises:
transmitting the command to open the door based on the direction satisfying a direction threshold and the speed satisfying a speed threshold.

12. The method of claim 9, wherein the environment of the door includes an exterior volume associated with people entering a structure through the door and an interior volume associated with people exiting the structure through the door.

13. The method of claim 9, further comprising:
receiving input associated with maintaining the door in an open position; and
transmitting a command to disable the optical sensor based on the input.

14. The method of claim 13, further comprising:
transmitting a command, to the controller associated with the door, to maintain the door in the open position based on the input.

15. A non-transitory computer-readable medium storing a set of instructions for automatic door sensing, the set of instructions comprising:
one or more instructions that, when executed by one or more processors of a device, cause the device to:
receive, from an optical sensor, a plurality of frames encoding images of an environment of a door;
classify the plurality of frames as including at least one person;
estimate, using the plurality of frames, a direction associated with the at least one person;
identify at least one article of clothing associated with the at least one person in at least one of the plurality of frames; and
transmit a command to a controller associated with the door based on the direction and the at least one article of clothing,
wherein the one or more instructions, that cause the device to transmit the command, cause the device to:
transmit a command to open the door based on the at least one article of clothing satisfying a clothing threshold, or
transmit a command to keep the door closed based on the at least one article of clothing not satisfying a clothing threshold.

16. The non-transitory computer-readable medium of claim 15, wherein the one or more instructions, when executed by the one or more processors, further cause the device to:
identify an orientation associated with the at least one person in at least one frame of the plurality of frames,
wherein the command is further based on the orientation.

17. The non-transitory computer-readable medium of claim 15, wherein the one or more instructions, that cause the device to identify the at least one article of clothing, cause the device to:
apply a clothing classifier to a portion of the plurality of frames, wherein the portion is based on output from a person classifier that classified the plurality of frames as including the at least one person.

18. The non-transitory computer-readable medium of claim 15, wherein the plurality of frames are encoded as separate image files.

19. The non-transitory computer-readable medium of claim 15, wherein the clothing threshold is a type of clothing.

20. The non-transitory computer-readable medium of claim 15, wherein the clothing threshold is satisfied when the at least one person is wearing required attire.

* * * * *